Aug. 3, 1965 B. E. SEAR 3,198,959

LOGIC SYSTEM EMPLOYING TUNNEL DIODE THAT IS BOTH D.C. AND CLOCK-PULSED BIASED

Filed Feb. 14, 1962 4 Sheets-Sheet 1

INVENTOR
BRIAN ELLIOTT SEAR

BY G. Donald Weber, Jr.

AGENT

Aug. 3, 1965 B. E. SEAR 3,198,959

LOGIC SYSTEM EMPLOYING TUNNEL DIODE THAT IS BOTH D.C. AND CLOCK-PULSED BIASED

Filed Feb. 14, 1962 4 Sheets-Sheet 3

United States Patent Office 3,198,959
Patented Aug. 3, 1965

3,198,959

LOGIC SYSTEM EMPLOYING TUNNEL DIODE THAT IS BOTH D.C. AND CLOCK-PULSED BIASED

Brian Elliott Sear, Oreland, Pa., assignor to Sperry Rand Corporation, New York, N.Y., a corporation of Delaware Filed Feb. 14, 1962, Ser. No. 173,251
12 Claims. (Cl. 307—88.5)

This invention relates to a system of circuits for providing logic functions. In particular, the system includes circuits which provide the logical AND operation and the logical OR operation and includes a circuit for inverting the function performed by the AND or the OR circuits. Each of the circuits in the system utilizes tunnel diodes as the active or switching components thereof.

In the construction of many large electronic systems, as for example large scale computing machines, the utilization of standard logic notation is oftentimes either required or desired. Moreover, it is the usual practice, for practical and economical reasons, to provide standardized circuits for performing the normal logic functions. Consequently, AND circuits, OR circuits and inversion circuits and the truth tables therefor are known in the art. Various circuits have been designed to perform these functions. However, the invention of the tunnel diode has provided another circuit component which has advantageous characteristics which are often desirable to utilize in constructing circuits for logic systems. Thus, this circuit system utilizes tunnel diodes as the active components therein whereby the extremely high speed operation of the tunnel diode operation may be utilized such that the logic system may be capable of performing operations faster.

The proposed system utilizes AND circuits, OR circuits and inversion circuits. However, it is to be understood that each of these circuits may be utilized separately and independently. Thus, the invention shows circuits utilizing a tunnel diode as the active switching element thereof which switches in accordance with the input information supplied by a diode cluster. The switching of the tunnel diode is effected by the application of a clock signal which effectively samples the input diode cluster and provides switching (or not) of the tunnel diode on a current sharing basis. The output is produced at one electrode of the tunnel diode and may be supplied to another diode cluster which may represent the input diode cluster for a further similar circuit. It may be seen that the invention includes an AND circuit and an OR circuit as well as an AND-OR complementary logic system. The type of circuit operation is dependent upon the specific arrangement of the tunnel diode in the circuit.

In some instances, it may be desirable to effect the inversion of one of the preceding stages thereby effecting substantially the function of a NOR circuit. The inversion stage again utilizes a tunnel diode which is switched from one state to the other by a clock signal in accordance with current sharing principles and the input information applied to the input diode cluster associated therewith. Again, the specific circuit operation is dependent upon the specific arrangement of the tunnel diode.

This circuit arrangement provides larger fan-in primarily because the reverse leakage of the coupling diodes can be made small. Moreover, fan-out may be made larger than in analog threshold circuits. Furthermore, higher speed are possible since the driving source or clock source which switches the tunnel diodes can be a low impedance source. These advantages are advantages which are desirable in the fabrication of any large scale system utilizing logical circuits.

From the foregoing, it may be seen that one object of this invention is to provide a high speed logical system.

Another object of this invention is to provide a high speed logical system which has wide tolerances on the components and the driving sources.

Another object of this invention is to provide a high speed logical system with large fan-in, fan-out properties.

Another object of this invention is to provide a logic system in which the number of components per logical element is minimized.

Another object of this invention is to provide a high speed logical system having complementary logic components.

These and other objects and advantages of this invention will become more readily apparent subsequent to a study of the following description which is to be read in conjunction with the attached drawings in which.

Figure 1:
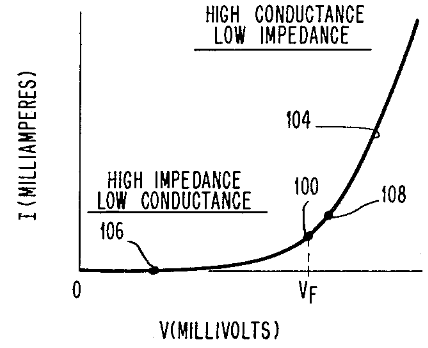
FIGURE 1 represents the V–I characteristics for a typical coupling diode of the circuit.

Referring now to FIGURE 1, there is shown a typical V–I characteristic for a diode. This characteristic comprises the high impedance, low conductance region 102 and the high conductance, low impedance region 104. The definition of the regions is well known and is not necessary to be established. These regions are conventionally denoted as being separated arbitrarily by the breakpoint 100 which designates the forward voltage $V_F$. In different diodes, the relative values of the different regions vary considerably. In the circuits shown subsequently, the coupling diodes may be, for example, Fairchild type FD1150 diodes. These diodes are silicon diodes and may have a potential of approximately 400 millivolts as the breakpoint potential. That is, $V_F$ equals approximately 400 millivolts. Thus, when the potential difference across the diodes is less than 400 millivolts the diode acts as a very large impedance (ideally the diode acts as an open circuit). On the contrary, when the potential across the diode exceeds the breakpoint potential, the diode acts substantially as a short circuit (in the ideal case). In practice, the impedance varies between approximately 50 ohms and 1 megohm in the different stages.

Figure 2:
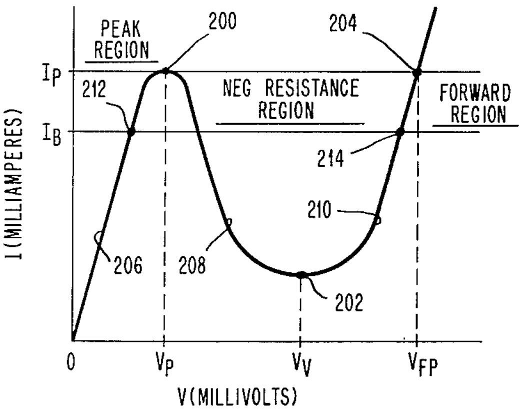
FIGURE 2 represents the V–I characteristics of a typical tunnel diode utilized in the circuit.

Referring now to FIGURE 2, there is shown a typical V–I characteristic for a tunnel diode. In the circuits of the system shown subsequently, the tunnel diode may be for example a type 1N651 manufactured by Texas Instruments. This tunnel diode is a gallium arsenide tunnel diode which has higher voltage and current handling capacities and is used in the inversion or negation circuits described subsequently. The tunnel diodes utilized in the AND or OR circuits may be G.E. type 1N2941 diodes which are germanium and have lower values at corresponding operating points. As usual, the V–I characteristic for a tunnel diode may be broken into three regions which are well known. The regions are the peak region 206, the negative resistance region 208 and the forward region 210. According to the definition, the regions are found to be defined by the peak voltage point 200, the valley voltage point 202 and the forward voltage point 204. Typical values for the potential for the diodes designated are: peak voltage $V_p$ equals 50(Ge), 100(GAs); valley voltage, $V_v$ equals 350(Ge), 450(GAs); and forward voltage, $V_f$ equals 500(Ge), 1100(GAs); where the values are given in millivolts. Likewise, the value for the peak current $I_P$ is approximately 5(Ge), 10(GAs) where the values are given in milliamperes. In a typical application, the bias current $I_B$ is approximately 0.7 $I_P$.

Figure 3:
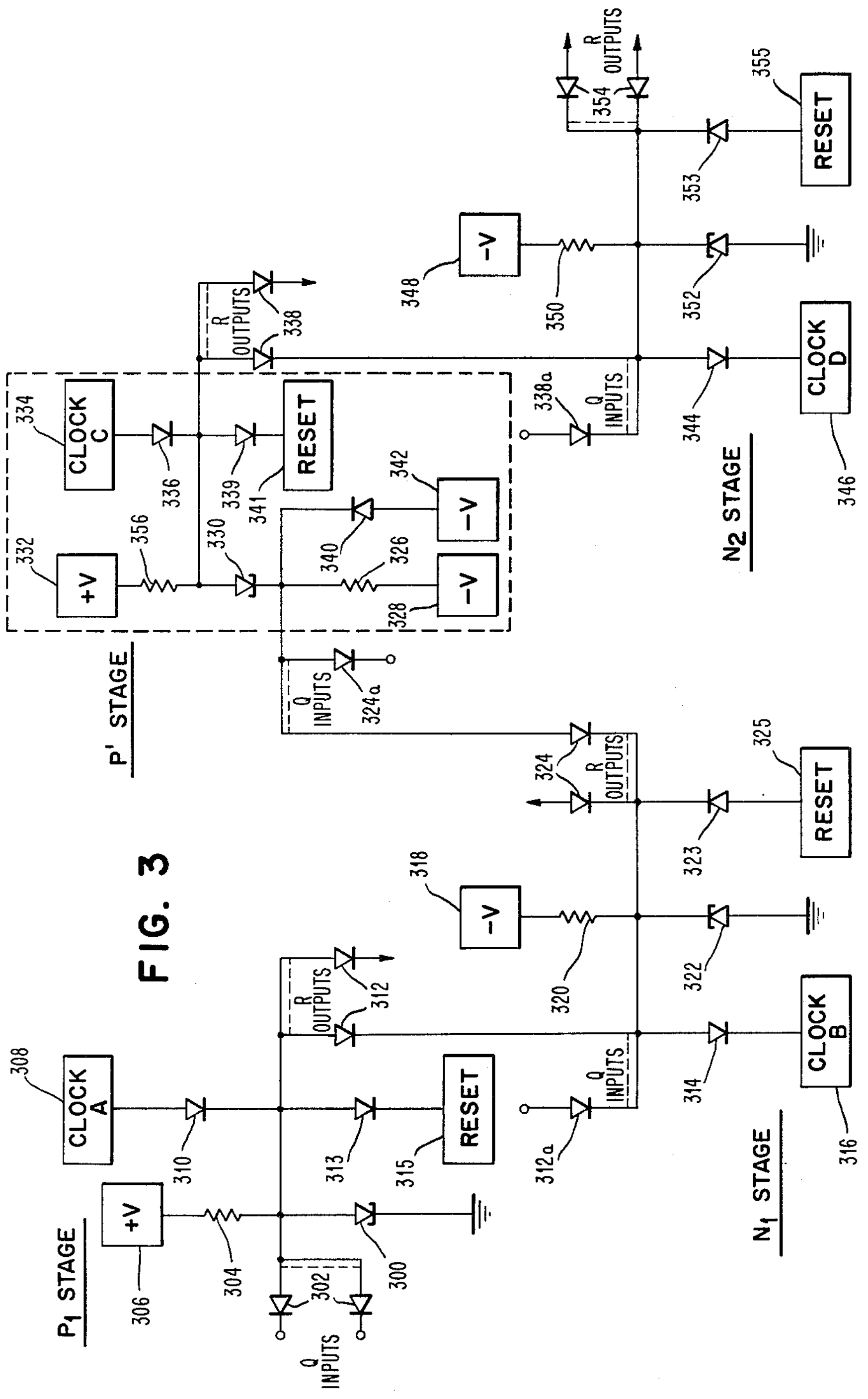
FIGURE 3 shows one embodiment of a system utilizing complementary AND-OR logic with inversion of the AND logic components.

Referring now to FIGURE 3, there is shown a circuit system utilizing the basic circuit concept and providing AND, OR and inverting logic functions. The AND circuits are designated as P stages; the OR circuits are designated as N stages; and the inverted AND gate is designated as a P′ stage. This designation of the stages is somewhat arbitrary but is also mnemonic inasmuch as the P circuit comprises a tunnel diode biased positively with respect to ground and the N circuit comprises a tunnel diode biased negatively with respect to ground. The P′ stage comprises a tunnel diode which is biased to be floating relative to ground but is related to the P circuit in operation. As shown in FIGURE 3, the system comprises several logic circuits of which the first P stage has for the input coupling means thereof, the diodes 302. These diodes which may be silicon diodes for example have the cathodes thereof connected to receive input signals. As shown, there may be Q input diodes each of which has the anode thereof connected to the anode of tunnel diode 300. Tunnel diode 300 may be, for example, a germanium diode of the 1N2941 type manufactured by G.E. The anode of tunnel diode 300 is further connected via resistor 304 to voltage source 306. The source 306 provides a potential on the order of about +10 volts with respect to ground. The source 306 and resistor 304 are utilized to provide a substantially constant current source for the tunnel diode. This constant current source biases the tunnel diode 300 to the point 212 of FIGURE 2. The cathode of the tunnel diode 300 is returned to ground whereby the biasing of the tunnel diode anode above ground is effected. Also connected to the anode of tunnel diode 300, is the cathode of diode 310 which has the anode thereof connected to clock source 308. The clock source provides periodic signals which have a potential of about +1.0 volt and which endure for approximately 2 nanoseconds. These positive going clock signals provide an input sampling operation. Reset diode 313 has the anode thereof connected to the anode of tunnel diode 300 and the cathode thereof connected to reset clock source 315. Source 315 provides signals which are substantially the inverse of the signals supplied by source 308, but supplied prior thereto. Reset clock 315 causes tunnel diode 300 to be switched to the low voltage operating state. The output from the $P_1$ stage is provided at the anode of the tunnel diode 300. In accordance with the provisions of this circuit, the circuit can drive R outputs. These R outputs are represented by the diodes 312 each of which has the anode thereof connected to the anode of tunnel diode 300. It is to be understood of course, that the "output" diodes 312 (which are also silicon type diodes), may in actuality represent the input diodes to further circuits. That is, the individual circuits shown do not necessarily incorporate both Q input diodes and R output diodes.

Thus, as shown in FIGURE 3, one of the output diodes 312 is connected as one of the Q input diodes which drive the succeeding $N_1$ stage. The Q input diodes 312, 312*a* are connected to the cathode of tunnel diode 322 which has the anode thereof connected to ground whereby the cathode of the tunnel diode is effectively biased to a negative potential. Also connected to the cathode of tunnel diode 322 is resistor 320 and the anode of diode 314. The cathode of diode 314 is connected to the clock source 316 which provides ground potential referenced negative going pulses similar in magnitude to those supplied by source 308 except out of phase therewith. The resistor 320 couples the voltage source 318 to tunnel diode 322 thereby effecting a substantially constant current source which biases the tunnel diode to the low voltage state. Reset diode 323 has the cathode thereof connected to the cathode of tunnel diode 322 and the anode thereof connected to reset clock source 325. The signals supplied by this source are positive going with respect to ground and serve a function similar to the signals of source 315. The R output signals derived from the $N_1$ stage are provided at the cathode of the tunnel diode 322. Again the outputs are represented by diodes 324 each of which has the cathode thereof connected to the cathode of tunnel diode 322 and the anode thereof connected to a succeeding stage. That is, the so-called output diodes 324 are, in effect, identical with the input diodes 324*a* of the succeeding stage.

The P′ stage as in the case of the preceding stages is driven by R input diodes 324 and 324*a*. The anodes of the input diodes are connected to the cathode of the tunnel diode 330. The tunnel diode in the P′ stage is a gallium arsenide tunnel diode for example a 1N651 diode manufactured by Texas Instruments. It will be seen that the tunnel diode 330 is not grounded at either electrode thereof but rather is connected (at the anode) to a positive potential source 332 via resistor 356 and (at the cathode) to a negative potential source 328 via resistor 326. The potential sources 332 and 328 each provide a potential, the magnitude of which is about 10 volts. Inasmuch as these potential sources are substantially identical, the tunnel diode effectively is floating about ground. Thus, when the tunnel diode is biased to the low voltage condition shown in FIGURE 2, the anode and cathode exhibit potentials of approximately +50 and −50 millivolts, respectively. The cathode of tunnel diode 330 is coupled to a further potential source 342 via diode 340. The source 342 provides a potential of about −200 millivolts. This circuit is effective to clamp the tunnel diode when outputs are being derived therefrom. A clock source 334, which provides signals similar to those previously described is connected to the anode of tunnel diode 330 via diode 336. Reset diode 339 is connected between reset source 341 and the anode of tunnel diode 330 in order that the tunnel diode may be controllably switched to the low voltage operating state. Reset clock source 341 provides negative going signals similar to those supplied by source 315. The R outputs provided by the P′ stage are derived at the diodes 338 each of which has the anode thereof connected to the anode of tunnel diode 330. Again, the R output diodes are also representative of the Q input diodes 338*a* which drive the succeeding stage.

The $N_2$ stage which is driven by signals applied to the input diodes 338*a* comprises a tunnel diode 352 which has the anode thereof grounded and the cathode thereof connected to the cathodes of the input diodes 338, 338*a*. The cathode of tunnel diode 352 is connected to sources 346 and 348 by diode 344 and resistor 350, respectively. Source 346 is a clock source similar to the previously described clock sources and provides signals which are negative going with respect to ground potential. The source 348 provides a potential of about −10 volts such that in combination with resistor 350 a substantially constant current is supplied to tunnel diode 352 whereby the tunnel diode is biased in the low voltage state. Reset diode 353 has the cathode thereof connected to the cathode of tunnel diode 352 and the anode thereof connected to reset clock source 355. Source 355 provides positive going signals which reset tunnel diode 353 to the low voltage operating state. In stage $N_2$ the outputs are derived from the cathode of tunnel diode 352 and are presented via output diodes 352. As noted supra, the output diodes of any stage may, in fact, represent the input diodes of the succeeding stage, and may in fact be omitted. At least one of diodes 354 may, in fact, be considered as being identical to at least one of diodes 302 such that a recirculating type of circuit may be provided.

Figure 4:
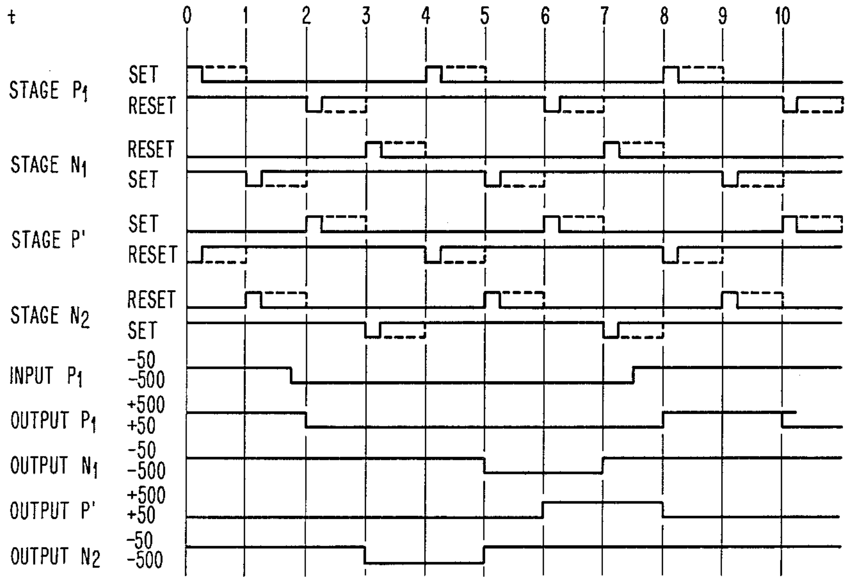
FIGURE 4 is a timing diagram which is applicable to the embodiment shown in FIGURE 3.

The operation of the circuit shown in FIGURE 3 is more fully understandable when described in conjunction with the timing diagram shown in FIGURE 4. It is to be understood, of course, that the clocking arrangement shown is illustrative only and is not meant to be limitative of the invention. The set signal is the signal which is utilized to sample the input to the circuit where as the reset signal is utilized to switch the tunnel diode back to the low voltage state, if necessary. In the case of the P or P′ circuits, a set signal is a positive going signal and the reset signal is a negative going signal with respect to ground potential. In the case of the N stages, the set signal is a negative going signal and the reset signal is a positive going signal. It will be seen that though the system as described is a four phase clocking arrangement, the clocking may actually be comprised of two clock sources which are 90° out of phase, each of which is fed to a circuit directly and also to another circuit through an inverter thereby providing a four phase arrangement. Also as shown in FIGURE 4, the clock signal may be construed as being a substantially pulse type signal as for example shown by the solid line, or in the alternative, it may be considered to be substantially level type signals (substantially longer than the pulse signal previously described) and shown by a dashed line in FIGURE 4. The specific duration of the clock signals is not meant to be a portion of the invention per se.

As a matter of explanation, it should be understood that the input signals supplied to stage P1 (signal Input P1) is an arbitrary signal applied to illustrate the operation of the overall system. For illustrative purposes only, it is assumed that the Input P1 signal is supplied by a preceding N stage or the like such that the signal will switch between −50 and −500 millivolts. It should be understood that the output signal provided by any of the N stages varies between −50 and −500 millivolts. Contrariwise, the output signal from the P stages varies between +50 and +500 millivolts. Also, the P′ stage inverts the input signal supplied thereto as will become more readily apparent subsequently. Moreover, it will be assumed initially, that each of the stages shown have been reset; that is, the tunnel diodes in each of the circuits shown are operating in the low voltage condition.

The stage P1 set clock signal supplied by clock source 308 is applied at time period *t0*. As suggested supra, the clock A signal may be a pulse at time period *t0* or it may be a level signal which exists until time period *t1*. During the application of the set clock signal, the input signal applied to the cathode of diode 302 and thereby to stage P1, is defined as being a high level signal or a signal of approximately −50 millivolts. This input signal is supplied to the stage P1 via one of the Q input diodes 302. For purposes of illustration, it is assumed that each of the Q input diodes has applied thereto a similar signal whereby each of the input diodes 302 are reverse biased. These diodes are reverse biased inasmuch as they are diodes which according to the characteristics thereof require a potential drop thereacross on the order of about 400 millivolts in order to exceed the breakpoint of the diode characterteristic. With a smaller potential drop thereacross, the diodes may be considered effectively as large impedances (ideally the diodes are open circuits). Inasmuch as the tunnel diode 300 was initially biased in the low voltage condition, the potential at the anode of the diode is approximately +50 millivolts. Therefore, the voltage drop between the anode and the cathode of the diode 302 would be on the order of approximately 100 millivolts. This potential difference is represented by the operating point 106 on the diode characteristic shown in FIGURE 1. Clearly, the input diode acts at a very high impedance. Consequently, the application of the set clock signal by source 308 via diode 310 raises the potential at the anode of tunnel diode 300 to a level which is greater than the valley voltage. Thus, the tunnel diode will be switched from the low voltage state to the high voltage state. When the tunnel diode 300 is in the high voltage state, the anode thereof exhibits a potential of about +500 millivolts. Thus, it may be seen that source 306 and resistor 304 effectively comprise a steady state constant current source of about 0.7 $I_P$ (where $I_P$ is the peak current) which biases the tunnel diode to the low voltage state but that the application of a set signal by clock source 308 via diode 310 to the tunnel diode 300 is effective to switch the tunnel diode to the high voltage state. The input signal to stage P1 is purely arbitrary with the illustration herein and this signal is shown to terminate between time periods *t1* and *t2*. On the contrary, the output signal from stage P1 remains at the high level inasmuch as the tunnel diode was switched to the high voltage state and remains thereat until reset. At time period *t2*, the reset clock source 315 presents a reset signal to the circuit. That is, source 315 provides a negative-going signal via diode 313. Once again, the input and output diodes are back-biased (i.e., the anodes thereof are driven negative with respect to ground). The reset signal at diode 313 may be considered to draw current from the tunnel diode 300 or to reduce the potential at the anode thereof to such a degree that the operating point of the tunnel diode is effectively moved below the valley point, whence the tunnel diode will switch from the high voltage state to the low voltage state. The potential at the anode of the tunnel diode, therefore, will switch from +500 to +50 millivolts which potential is applied to the anodes of the output diodes 312. The output signals will remain at the low level until a further set clock signal is applied simultaneously with the application of a high level signal to the input of the circuit so as to produce a current through the tunnel diode which is sufficient to switch said tunnel diode.

At time period *t4* the next set clock signal is applied to stage P1. In this instance, a potential of approximately −500 millivolts is applied to the cathode of at least one of the input diodes 302. Inasmuch as the anode is at approximately +50 millivolts and the cathode is at approximately −500 millivolts, it may be seen that the potential difference across the diode is on the order of 550 millivolts. This potential difference is graphically represented by operating point 108 on the diode characteristic curve shown in FIGURE 1. Clearly, when operating thus, the diode represents a very small forward impedance (on the order of 30 ohms). With the application of a set clock pulse at time period *t4* current is passed from source 308 via diode 310 and diode 302 to the low level source connected to the cathode of diode 302. Thus, it will be seen that the switching current which in the previous case was passed through the tunnel diode is now passed through the input diode and effectively bypasses the tunnel diode whereby the tunnel diode operating state is not affected. Though there is actually a current sharing between diode 302 and tunnel diode 300, the small current flow through the tunnel diode is insufficient to switch the tunnel diode to the high level operating condition. Consequently, the anode of the tunnel diode 300 and the output diodes connected thereto remain at the low level potential of approximately +50 millivolts. When the reset signal is applied to stage P1 at time period *t6*, there is no actual resetting of the tunnel diode 300 inasmuch as the diode was not previously set to the high voltage condition.

As shown in FIGURE 4, the arbitrary input signal supplied to input P1 changes from the low level signal −500 millivolts to the high level signal of −50 millivolts after time period *t7*. The input signal then continues at the high level. At time period *t8*, the set clock signal is applied to the circuit via clock source 308. As described supra, the positive going signal supplied by source 308 via diode 310 raises the potential at the anode of tunnel diode 300 inasmuch as the input diodes are back-biased and cannot provide a current path. The tunnel diode 300 is switched from the low voltage state to the high voltage state and a high level output signal is provided at the anode thereof and at the anodes of the R output diodes 312.

Clearly, output P1 (the output signal from stage P1) may be considered as the input signal to stage N1. Thus, at time period $t0$ through time period $t1$ the signal applied to the anode of input diode 312 is a high level signal of about +500 millivolts. Moreover, since the tunnel diode 322 is initially assumed to be reset to the low voltage condition, the cathode thereof as well as the cathode of input diode 312 resides at approximately −50 millivolts. Clearly, the potential difference across the input diode is on the order of 550 millivolts which is represented by operating point 108 on the V–I characteristic shown in FIGURE 1. Clearly, in this operating point the forward impedance of the input diode is relatively low. Therefore, with the application of the set clock signal (a negative-going signal with respect to ground potential) at time period $t1$, current passes through diode 314 to source 316. Inasmuch as diode 312 is a relatively low impedance when forward biased, a current sharing operation obtains and some of the current which previously passed through and switched tunnel diode 322 now passes through the diode 312. Consequently, the tunnel diode 322 is not switched and the potential at the cathode thereof remains at −50 millivolts. Thus, it will be seen that the output signal N1 (the output signal supplied by stage N1), remains at the high level or −50 millivolt stage. After time period $t2$, the output signal P1 changes from +500 to +50 millivolts inasmuch as the stage P1 reset signal has been applied by clock source 315 to stage P1. Therefore, the potential value existing across input diode 312 drops to approximately 100 millivolts whereupon the diode is biased at about the operating point represented by 106 in FIGURE 1. At this operating point the diode is a high impedance. With the application of the stage N1 reset signal at time period $t3$, there is no change in the output of the circuit (stage N1) inasmuch as the tunnel diode 322 was not switched prior to the application of the reset signal and will not be reswitched thereby.

As previously noted, the input signal to stage N1 was switched to a low level signal at time period $t2$. Thus, during time period $t5$ the application of the stage N1 set clock signal (a negative going signal with respect to ground) draws current through diode 314. With the preceding clock pulse, current was drawn through diode 312 from source 306. However, at the application of a clock signal at time period $t5$ the diode 312 is an extremely high impedance and cannot pass current therethrough. Therefore, current must pass through the tunnel diode 322. This current passage is effective to switch the tunnel diode 322 from the low voltage operating condition to the high voltage operating condition. With the switching of the tunnel diode, the potential drop thereacross switches from 50 to approximately 500 millivolts. Inasmuch as the anode of the diode is grounded, the cathode exhibits a potential of approximately −500 millivolts. Thus, at time period $t5$ the output signal provided by stage N1 switches from the high level −50 millivolts signal to the low level −500 millivolt signal. This low level output signal exists at the cathode of tunnel diode 322 (as well as the cathodes of output diodes 324) through to time period $t7$. The reset clock signal is applied to the tunnel diode 322 at time period $t7$. This reset signal, as stated supra, switches the tunnel diode 322 from the high level operating condition to the low voltage operating condition. When the tunnel diode switches back to the low voltage operating condition, the potential at the cathode thereof switches from −500 to −50 millivolts. At time period $t8$, it is seen that the output signal from stage P1 (the input to stage N1) switches from the low level to the high level signal. It is also observed that at time period $t10$ the input signal applied to stage N1 switches from the high level to the low level signal because of the reset signal supplied to stage P1. Inasmuch as stage N1 was not sampled by a set clock signal during this time there was no change in the output supplied by stage N1.

The output signal supplied by stage N1 via the R output diodes 324 may be considered to be the input signal to stage P′ via Q input diodes 324, 324*a*. Stage P′ is somewhat different from the other standard stages in the system. This stage (P′) is a type of hybrid NOR circuit in that an inversion of the input signal is provided. Moreover, the tunnel diode is connected at each of its electrodes to a different substantially constant current source. The anode of the tunnel diode 330 is connected to the potential source 332 via the resistor 356 while the cathode of the tunnel diode is connected to potential source 328 via resistor 326. Inasmuch as potential sources 332 and 328 are of the same magnitude (though of opposite polarities) the tunnel diode is effectively floating about ground potential. Consequently, the potential drop across the tunnel diode is exhibited such that approximately one-half the potential drop is exhibited as a positive potential with respect to ground at the anode thereof and the cathode thereof exhibits approximately one-half the potential difference across the tunnel diode as a negative potential with respect to ground. For example, with a typical gallium arsenide tunnel diode the low voltage biased potential would produce a drop of approximatelyy 100 to 150 millivolts across the tunnel diode. In this condition, the anode of the tunnel diode 330 would exhibit a potential of between +50 and +75 millivolts whereas the cathode of the tunnel diode would exhibit a potential of approximately −50 to−75 millivolts. Moreover, the functional application of the P′ stage is somewhat different than the standard AND-OR stage operation in that the tunnel diode is switched from the low to the high voltage operating condition when current passes through the tunnel diode via the input diode.

The operation of the circuit is more clearly understood in terms of the waveforms shown in FIGURE 4. Thus, it is assumed that the tunnel diode 330 is initially reset to the low voltage operating condition. Even if this assumption were not made the initial signal applied at the time period $t0$ is a reset signal which would drive the tunnel diode to the low level operating condition anyway. It is seen that the input signal supplied to the Q input diodes 324, 324*a* by stage N1, is a high level or −50 millivolt signal between time period $t0$ and time period $t5$. Inasmuch as the tunnel diode exhibits a potential at the cathode thereof on the order of −50 to −75 millivolts, the input diode 324 is effectively back-biased and presents a large impedance in that branch of the circuit. Consequently, when the stage P′ set clock signal is applied by source 334 via diode 336 at time period $t2$, the tunnel diode 330 is not switched. The tunnel diode 330 is not switched because sources 328 and 332 are relatively high potentials (a magnitude on the order of 10 volts) and the resistors 326 and 356 are large impedances (on the order of 3000 ohms) whereby substantially constant current sources are provided at the anode and cathode of the tunnel diode. These constant current sources supply currents on the order of 3 to 4 milliamperes through the circuit (the precise current supplied is dependent upon the requirements of the tunnel diode utilized). The clock source 334 supplies an input signal of about 0.5 volt via diode 336 which has a forward impedance of about 30 ohms. When the potential is considered between source 334 and source 328 via diode 336, resistor 326, and tunnel diode 330, it will be seen that the small voltage change of 334 via the large impedance in the network will produce a substantially insignificant increase in current flow through the circuit which will be substantially immaterial in the operation of the tunnel diode. That is, for sake of example, consider a tunnel diode 330 biased about 0.7 of $I_P$ where $I_P$ is 5 milliamperes. Thus, the tunnel diode would exhibit a current on the order of 3 to 4 milliamperes. The current supplied via source 334 and diode 336 would be on the order of .15 milliampere. Clearly, .15 milliampere signal is insufficient to drive the tunnel diode from the 4 milliampere operating stage beyond the 5 milliampere (peak current) operating stage as required in order to switch the tunnel diode to the high voltage operating condition. Thus, so long as the input diodes are reverse-biased the tunnel diode will not be switched to the high voltage operating condition by the application of the set clock pulse.

As shown in FIGURE 4, the input signal supplied to stage P′ changes from the high level to the low level signal at time period *t5*. Thus, the potential at the cathode of input diode 324 changes from —50 to —500 millivolts thereby creating a potential difference across the diode of approximately 450 millivolts such that the diode is operating in a region represented by point 108 in FIGURE 1. Therefore, the input diode is now forward-biased and presents a relatively low forward impedance (on the order of 30 ohms) in the input circuit. Consequently, with the application of a stage P′ set clock signal at time period *t6* current will flow from source 334, through diode 336, tunnel diode 330, and input diode 324 to source 318. Now it will be seen that the impedance in the current path comprises only diode 336 (forward impedance on the order of 30 ohms), input diode 324 (which has a forward impedance of approximately 30 ohms) and the forward impedance of tunnel diode 330. Thus, the current now supplied to the tunnel diode 330 by the potential increase of source 334 is in the range of 5 to 10 milliamperes. Clearly, in the illustration previously noted, the tunnel diode 330 may be switched to the high voltage operating condition by this current. With the switching of the tunnel diode to the high operating condition, the potential at the anode and cathode thereof switch to approximately 450–500 millivolts. It may be seen that this switching of the tunel diode will now back bias the input diode 324. However, this change in the impedance of the input diode 324 is immaterial at this time.

Considering this operation in terms of potential, it may be seen that similar results are obtained. The tunnel diode is initially biased such that the anode resides at about +50 millivolts and the cathode resides at about —50 millivolts. When the input signal applied to diodes 324, 324*a* is a high level signal (—50 millivolts) the diodes 324, 324*a* are effectively cutoff. Thus, when the potential of the anode of tunnel diode 330 is raised toward +500 millivolts by the application of a set clock signal by source 334, the maximum potential drop across the tunnel diode is on the order to the peak potential (or less) in millivolts. That is, the clock signal is about +500 millivolts and diode 336 drops about 300 millivolts thereacross whereby the anode of tunnel diode 330 resides at a maximum of about +200 millivolts. The potential at the cathode of tunnel diode 330 tends to rise to about +100 millivolts. Since the potential drop across the tunnel diode remains below the peak potential, the tunnel diode will not switch to the high voltage operating state.

When the input signal is a low level signal (—500 millivolts) the cathode of tunnel diode 330 initially resides at about −150 millivolts and the anode thereof resides at about —50 millivolts. With the application of a clock signal (+500 millivolts) the anode of tunnel diode 330 rises to about +200 millivolts. These potential values produce a 350 millivolt potential difference across the tunnel diode whereby the tunnel diode switches to the high voltage operating state. It is to be understood, of course, that the description of the operation in terms of the potentials or the currents are mutually compatible and interdependent. In particular, the operating characteristics of each component must be investigated.

The potential at the anode of tunnel diode 330 is supplied to the anodes of the R output diodes 338 until the reset clock signal is supplied to tunnel diode 330 by source 341. With the application of the negative going reset signal the magnitude of which is approximately —500 millivolts, the potential at the anode of tunnel diode 330 is switched toward about —150 millivolts. Inasmuch as the potential applied to both the anode and the cathode of the tunnel diode is of the same order of magnitude, the potential difference across the tunnel diode is approximately zero volts. Clearly, the tunnel diode will switch to the low voltage operating condition when the potential difference thereacross is below the peak voltage for the tunnel diode. Thus, with the application of the stage P′ reset signal at time period *t8*, the tunnel diode 330 is switched back to the low voltage operating condition and the voltage produced at the anode thereof as well as at the anodes of output diodes 338 is on the order of +50 millivolts. Inasmuch as the input signal applied to input diodes 324 is a high level signal during the application of further clock pulses, stage P′ continues to produce a low level output signal.

As a preferred improvement which is not absolutely necessary to the circuit operation, a clamping network comprising source 342 and diode 340 is provided. Source 342 may provide a pulsating potential (about 300 millivolt pulses) which is syncronous with the clock potential supplied by source 346 in stage N2 or may supply a substantially constant potential of about +150 millivolts. This network serves to clamp the cathode of tunnel diode 330 to a predetermined potential (0 to —150 millvotes) whereby a larger fan-out is possible. That is, if not clamped, tunnel diode 330 would be free to float relative to ground potential and the anode potential would tend to drop when an output was produced. However, the clamping network limits the "free-swing" or "floating" of the tunnel diode whereby virtually the entire output potential is utilizable.

The output signal from stage P′ is, of course, the input signal to stage N2. The operation of stage N2 is identical to the operation of previously described stage N1. That is, when the input signal is a high level (—500 millivolts) signal a set clock signal applied to stage N2 will have no effect on the tunnel diode therein and the output signal will remain as a high level (—50 millivolt) signal. On the contrary, however, when the output from the P or P′ stage is a low level (+50 millivolt) signal, the application of a set clock signal to stage N2 will cause the tunnel diode 352 to switch to the high voltage operating condition whereby the output signal becomes a low level (—500 millovolt) signal. Thus, for example, at time period *t0* the output signal from stage P′ or the input signal to stage N2 is a low level signal of +50 millivolts. As in the case of diode 312 in stage N1, input diode 338 is considered to be a high impedance inasmuch as tunnel diode 352 is assumed to have been initially reset thereby exhibiting a potential of —50 volts at the cathode thereof. Therefore, the output signal supplied by the anode of tunnel diode 352 to the cathode of the R output diodes 354 is a high level or —50 millivolt signal. The stage N2 reset clock signal applied to tunnel diode 352 at time period *t1* is of course of no significance inasmuch as the tunnel diode is already reset.

However, with the application of the set clock signal at time period *t3*, current is drawn through tunnel diode 352, diode 344 and clock source 346. Alternatively considered, the clock signal (—500 millivolts) at clock 346 switches the potential at the cathode of tunnel diode to about −150 millivolts. This provides a potential drop across the tunnel diode which is greater than the peak potential of the tunnel diode. This current is of sufficient magnitude as described supra to cause tunnel diode 352 to switch from the low voltage operating condition to the high voltage operating condition. When tunnel diode 352 is switched to the high voltage operating condition, the potential difference thereacross is on the order of 500 millivolts. Inasmuch as the anode of the tunnel diode is grounded, the cathode thereof exhibits a potential of approximately −500 millivolts. This −500 millivolt potential is of course applied to the anodes of the R output diodes 354 thereby providing a low level output signal. Inasmuch as the tunnel diode is a bistable device, the output signal remains at the same level until the application of the reset clock signal at time period *t5*. As described supra, this positive going reset signal causes tunnel diode 352 to switch from the high voltage to the low voltage operating condition whereupon the potential at the cathode thereof switches from −500 to −50 millivolts. The −50 millivolt potential is applied to the cathodes of the R output diodes 354 thereby providing a high level output signal. With the application of the set clock signal at time period *t7*, it is seen that the input diode 338 is a low forward impedance inasmuch as the output signal supplied by stage P′ is a high level or +500 millivolt signal. Thus, with the application of the negative going set clock signal, current flows through the input diode and diode 344 to the source 346 and tunnel diode 352 is not affected. Actually, a small current may be drawn through the tunnel diode but this current is insufficient to cause the tunnel diode to switch. Consequently, the output potential at the cathode of tunnel diode 352 remains at −50 millivolts. The reset clock signal applied at time period *t9* of course is not necessary inasmuch as the tunnel diode need not be switched back from the high voltage to the low voltage operating state. Clearly, these component values and parameters are illustrative only and modifications may be made in the circuit without materially altering the inventive concepts described. Certain modifications are suggested in the circuit of FIGURE 5.

Thus, it has been demonstrated that the typical P and N stages provide typical AND-OR complementary logic. In addition, a P′ stage has been shown to provide a negation gate or an inversion function of the operation of the normal P stage. As demonstrated above, this system is then capable of providing AND-OR logic and a hybrid type of NOR logic.

Figure 5:
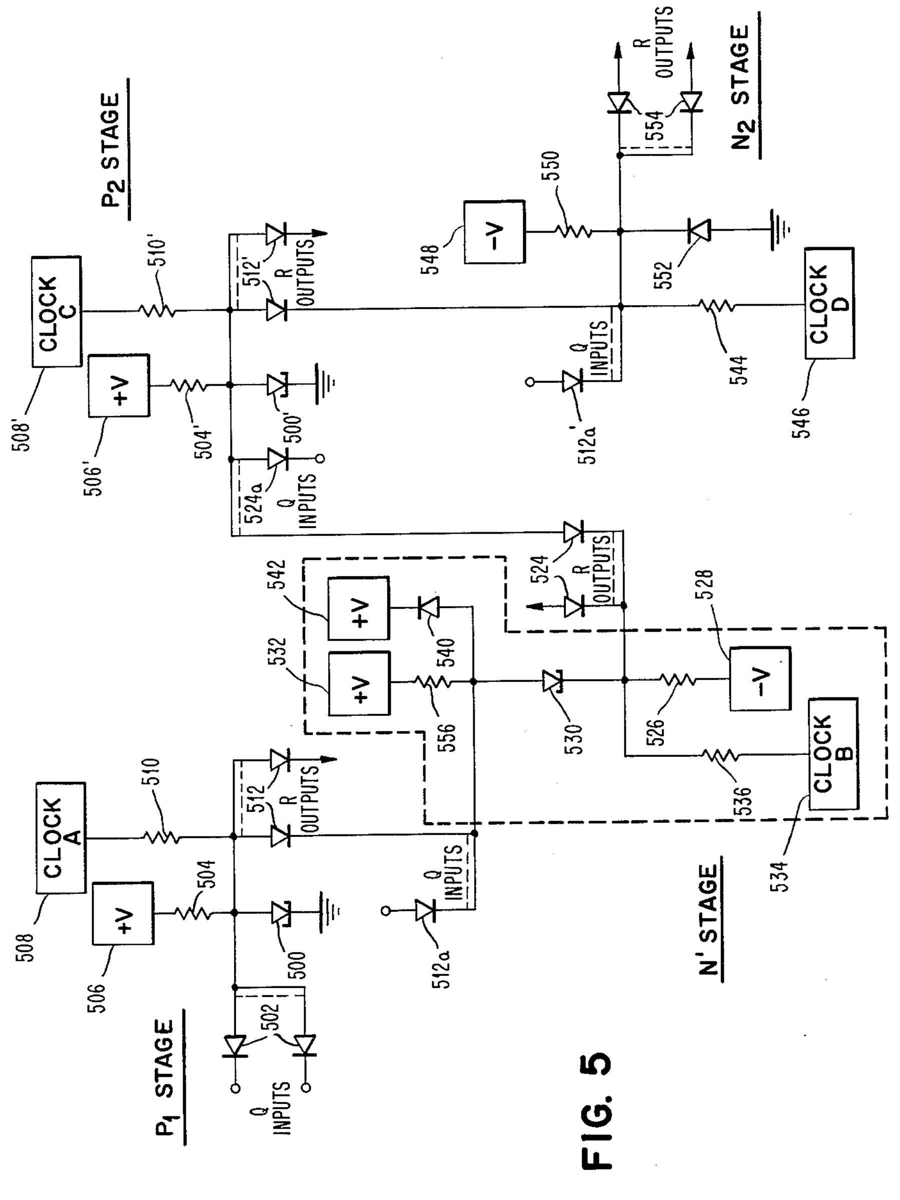
FIGURE 5 shows a further embodiment of the system utilizing AND-OR complementary logic with inversion of the OR logic elements.

Referring now to FIGURE 5, there is shown another embodiment of the logic system proposed. In this embodiment, components which are similar to components shown in the embodiment shown in FIGURE 3 or serve similar functions have the same last two digits—only the first digit is changed from a 3 to a 5. For example, the tunnel diode in stage P1 in FIGURE 3 is tunnel diode 300 whereas a similar diode in stage P1 of FIGURE 5 is tunnel diode 500. A variation in the embodiment shown in FIGURE 5 substitutes a bipolar clock for the separate set and reset clocks. This clock source is connected to the associated circuitry by a resistor. The circuit operation is substantially identical in principle with that of the circuit shown in FIGURE 3. Another distiction between the two embodiments, is that the embodiment of FIGURE 3 includes a negation stage P′ which inverts the signals of the P stage whereas FIGURE 5 shows a negation stage or inversion stage N′ which inverts the operation of an N stage. For purposes of illustration, in FIGURE 5 there is shown connected in series stage P1, stage N′, stage P2 and stage N2. As noted supra, stage P1 of FIGURE 5 is identical to stage P1 of FIGURE 3. Similarly, stage P2 of FIGURE 5 is identical to stage P1 of either figure both in configuration and in operation. In order to differentiate between the components of stage P1 and stage P2 the same reference numerals are utilized with the components of stage P2 being designated by a prime. Stage N2 of FIGURE 5 is identical to stage N2 of FIGURE 3. Thus, FIGURE 5 omits the utilization of a P′ stage but inserts stage N′ in place of stage N1 of FIGURE 3. In theory, stage N′ is similar in configuration and operation to stage P′ with the exception that the outputs thereof are inverted. That is, stage N′ utilizes positive value inputs and produces negative value outputs whereas the P′ stage utilizes negative value inputs and produces positive value outputs.

In particular, the gallium arsenide tunnel diode 530 of stage N′ of FIGURE 5 has the anode thereof connected via resistor 556 to a terminal of potential source 532 which is positive with respect to ground. Similarly, potential source 528 has a negative terminal thereof connected to the cathode of the tunnel diode via resistor 526. With the application of a set clock signal which is negative-going with respect to ground by source 534 via resistor 536 to the cathode of tunnel diode 530, current is drawn through the tunnel diode. The magnitude of the current is determined (similar to the P′ stage) by the forward impedance of input diode 512. That is, if the input diode 512 is a high impedance the current path between source 532 and source 534 is via resistor 556, tunnel diode 530, and resistor 536. As described supra, the amount of current added to the current flow normally passing through tunnel diode 530 via this path is a negligible amount and is insufficient to switch the tunnel diode. On the other hand, however, if diode 512 presents a low forward impedance, the current path for a set clock signal supplied by source 534 is from source 506 to source 534 via resistor 504, diode 512, tunnel diode 530 and resistor 536. As described supra, this path permits the addition of a substantial amount of current to the current flow through the tunnel diode 530 whereupon the tunnel diode is switched from the low voltage operating condition to the high voltage operating condition. The switching of the tunnel diode changes the potential value at the cathode thereof from approximately −50 millivolts to approximately −500 millivolts. Once again, the clamping circuit comprising source 542 and diode 540 is utilized during the resetting of the tunnel diode as well as the clocking of tunnel diode 500′. The operation of the clamping circuit shown in FIGURE 5 is similar to the operation of the circuit shown in FIGURE 3.

Figure 6:
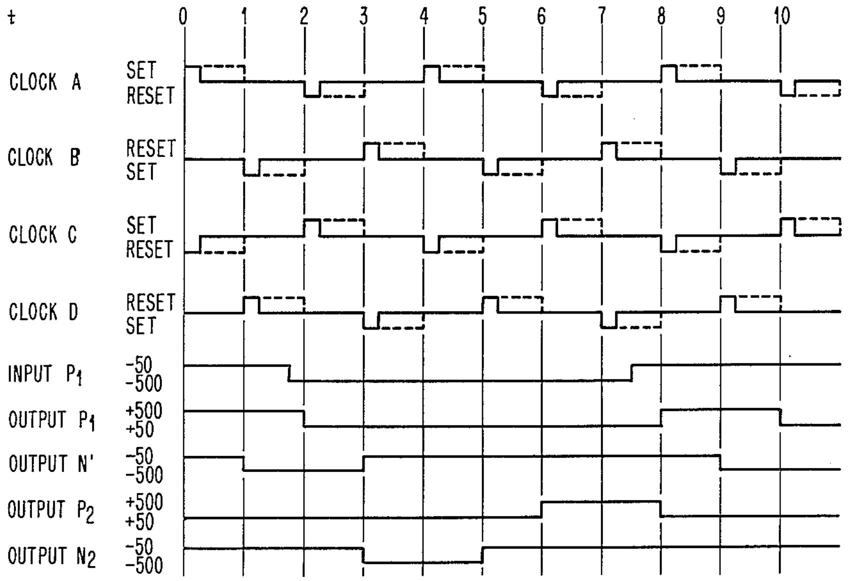
FIGURE 6 shows a timing diagram which is applicable to the system embodiments shown in FIGURE 5.

In describing the operation of the system, FIGURE 6 which is a timing diagram for the system shown in FIGURE 5, may be compared to the timing diagram shown in FIGURE 4. It will be seen that the timing relationships between clocks A, B, C and D (the clock signals applied to the various stages in the system) are identical to those shown in FIGURE 4. Moreover, the arbitrary input signal supplied to stage P1 is similar to the arbitrary input supplied to the system shown in FIGURE 3. That is, the input P1 signal is a high level (−50 millivolt) signal from time period *t0* through time period *t2*. At that time, input P1 switches to a low level (−500 millivolt) signal and remains thereat until time period *t7* when the input P1 signal switches back to the high level (−50 millivolt) signal. Inasmuch as stage P1 of FIGURE 5 is identical to stage P1 in FIGURE 3, the output signals therefrom are also identical. That is, the output P1 signal is a high level (+500 millivolt) signal from time period *t0* through to time period *t2*. This signal is a high level signal in response to the high level input signal being applied to the input diode 502 simultaneously with the positive going set clock A signal being applied to stage P1 at time period *t0*. The output P1 signal is switched to the low level (+50 millivolt) signal with the application of the negative going reset signal to stage P1 at time period *t2*. The application of a set clock A signal at time period *t4* in coincidence with the low level input signal applied to stage P1 will not cause the tunnel diode 500 to switch whereby the output signal remains at the low level signal. At time period *t8*, the set clock A signal is again applied to stage P1. This time the clock signal is applied simultaneously with a high level input signal at the input diode 502. Consequently, tunnel diode 500 is switched from the low voltage to the high voltage operating condition whereupon the output signal obtained from the anode thereof switches from +50 to +500 millivolts. Again, at time period *t10* the reset clock A signal causes tunnel diode 500 to be switched from the high voltage to the low voltage operating condition whereupon the output signal derived at the anode of the tunnel diode reverts to the low or +50 millivolt signal.

The output P1 signal is applied to the input of stage N'. As previously described, the tunnel diode is assumed to be initially reset to the low voltage operating condition. Consequently, tunnel diode 530 exhibits a potential of approximately −50 millivolts at the cathode and approximately +50 millivolts at the anode thereof. At time period *t1*, however, the set clock B signal is applied to stage N'. This clock signal is applied coincidentally with a high level input signal applied by input diodes 512. Consequently, current flow through tunnel diode 530 is defined and delimited by the path impedance of diode 512, tunnel diode 530 and resistor 536. In view of the small value of impedance in the circuit, the current is sufficient to switch the tunnel diode from the low voltage to the high voltage operating condition. Thus, the potential at the cathode of tunnel diode 530 switches from −50 to −500 millivolts and the potential at the anode switches from +50 to +500 millivolts. The application of the reset clock B signal at time period *t3* resets the tunnel diode 530 whereupon the output signal or the potential at the cathode thereof is switched back to −50 millivolts. In addition, the potential at the anode thereof switches to +50 millivolts thereby to effectively ready diode 512 for further input signal applications. The set clock B signal supplied to stage N' at time period *t5* is in coincidence with a low level input signal at the input diodes. The input diodes exhibit a high impedance whereupon the current flow through tunnel diode 530 is limited by the impedance in the path from source 532 and including resistors 536 and 556, and tunnel diode 530. The large path impedances and the small clock signal produce a small current which is not sufficient to switch the tunnel diode to the high voltage operating condition. Consequently, the potential at the cathode of the tunnel diode remains at the −50 millivolt level (and the anode remains at +50 millivolts). The set clock B signal at time period *t9* is presented in coincidence with a high level input signal to the N' stage. As before, the diode presents a low forward impedance and the current supplied to the tunnel diode is sufficient to switch the tunnel diode from the low voltage to the high voltage operating condition. Consequently, the cathode thereof exhibits a potential of about −500 millivolts. A comparison of the waveforms shown in FIGURE 4 and FIGURE 6 will show that the operational waveform for stages N1 and N' are inverted. That this is the correct situation is clear inasmuch as stage N' is defined as performing the negation or inversion operation of an N stage.

Referring now to the stage P2, it is to be understood that stage P2 operates identically to stage P1. Thus, the reset clock C signal at time period *t0* assures that tunnel diode 500' is in the low voltage operating condition. Consequently, the output signal at the anode thereof is a low level (+50 millivolt) signal. The set clock C signal at time period *t2* is coincidental with the application of a low level input signal (−500 millivolt) thereto whereby the tunnel diode 500' is not switched to the high voltage operating condition. Thus, the output signal produced by stage P2 remains at the low level or +50 millivolt signal.

The set clock C signal which is applied to stage P2 at time period *t6* is, however, applied in conjunction with a high level (−50 millivolts) input signal which is applied via input diode 524. These simultaneous signals cause tunnel diode 500' to switch to the high voltage operating condition. That is, diode 524 presents a high impedance and current produced by the clock signal passes through the tunnel diode. Thus, the output potential produced at the anode of the tunnel diode 500' switches from +50 to +500 millivolts. The potential at the output of tunnel diode 500' remains at the high level signal until the application of reset clock C signal at time period *t8*, whereupon the output of stage P2 switches to the low level or +50 millivolt signal.

The application of the set clock C signal at time period *t10* is in coincidence with a low level input signal whereupon tunnel diode 500' is not switched inasmuch as diode 524 presents a low impedance path to the current supplied by the clock source 508' and the output produced by stage P2 remains at the low level signal.

The comparison of the waveform of the output signals produced by stage P2 with the output waveform produced by stage P' shown in FIGURE 4 will show that these waveforms are identical. That this is the case is coincidental only inasmuch as the illustrations presented produce such coincidence of signals. The illustrations shown are not meant to be limitative of the invention nor do they limit the operation of the invention nor is the operation of the invention limited to the illustrations shown. A review of the illustrations shown will make it clear that the system of FIGURE 3 uses a PNP'N configuration while the system of FIGURE 5 uses a PN'PN configuration. Thus, it will be seen that the middle two stages of both configurations are such that at least one inversion stage is included. Thus, in the particular illustrations presented, the output signal produced by the middle two stages and supplied to the final stage should be identical. That is, the signal produced by a combination of NP' stages should be identical to the signal produced by a combination of P'N stages. It is to be understood that modifications in the operation may be developed whereby this particular condition is not true.

Inasmuch as the input supplied to stage N2 in FIGURE 6 is identical to the input signal supplied to stage N2 shown in FIGURE 4, it is clear that the output signal supplied by stage N2 will be identical in both cases. That is, at time period *t3* a set clock D signal is supplied in conjunction with a low level input signal whereupon the tunnel diode 552 is switched to the high level voltage operating condition because diode 512' is a high impedance and permits substantially no current flow therethrough. The output potential at the cathode of the tunnel diode is, therefore, switched to approximately −500 millivolts. The tunnel diode is switched back to the low voltage operating condition at time period *t5* in response to the application of reset clock D signal which is positive going with respect to ground. The set clock D signal applied at time period *t7* is in coincidence with the application of a high level input signal to stage N2. Clearly, this combination of signals will not produce a switching current through tunnel diode 552 since diode 512' is a low impedance and permits current flow therethrough. Thus, the cathode of tunnel diode will remain at the low level signal of about −50 millivolts.

It is to be understood, that this invention relates to a logic system using complementary AND-OR logic as well as inversion or hybrid-NOR logic circuits. Moreover, it is to be understood that each of the individual circuits, as well as the system embodiments, are to be included within the scope of the appended claims. That is, principles of operation as taught by the foregoing description as well as modifications thereto are to be the basis for the claims but the claims are not to be limited in scope by the precise configurations of systems or circuits shown. Any modifications suggested to those skilled in the art which may be made to the circuit shown are meant to be included within the teaching of this invention so long as the modifications made thereto do not alter the principle of operation of this circuit.

The embodiments of the invention in which an exclusive property or privilege is claimed are defined as follows.

I claim:

1. A logic circuit comprising, a tunnel diode characterized by a peak current value, input means connected to one terminal of said tunnel diode,
output means connected to said one terminal,
bias means connected to said tunnel diode, to bias said tunnel diode for bistable operation,
said bias means supplying current having a magnitude near to, but below, the peak current value of said tunnel diode,
pulse supplying means connected to said tunnel diode to provide regularly recurring current pulses having a magnitude sufficient to drive said tunnel diode past the peak current value thereof in response to a predetermined signal condition at said input means,
and reset means for driving said tunnel diode back to the original operating condition.

2. A logic circuit comprising, a tunnel diode having two stable operating states,
input means connected to one terminal of said tunnel diode,
output means connected to said one terminal,
bias means connected to said tunnel diode,
said bias means supplying current having a magnitude such that said tunnel diode normally operates in one of said two stable operating states,
and bipolar clock pulse supplying means connected to said tunnel diode to provide current pulses having a magnitude sufficient to drive said tunnel diode from said one stable operating state in one sense to the other stable state only in response to one polarity pulse in coincidence with a predetermined signal condition at said input means and in the other sense to said one stable state in response to the other polarity pulse substantially regardless of the signal condition at said input means.

3. A logic system utilizing complementary AND-OR logic, a plurality of AND logic circuits, a plurality of OR logic circuits,
said AND logic circuits being coupled in cascade to said OR logic circuits in alternating arrangement,
each AND logic circuit and each OR logic circuit, comprising a tunnel diode, characterized by high and low voltage operating conditions,
input diode means connected to each said tunnel diode,
output means connected to each said tunnel diode, the output means of one tunnel diode connected to the input diode means of another tunnel diode to provide the cascaded coupling between said logic circuits,
bias means connected to each said tunnel diode to normally bias said tunnel diode to the low voltage operating condition,
and clock pulse supplying means connected to each said tunnel diode to supply periodic signals of sufficient magnitude switch said tunnel diode to the high voltage operating condition in response to predetermined signal levels at the associated one of said input diode means.

4. A logic system utilizing complementary AND-OR logic wherein AND logic circuits are coupled to OR logic circuits,
each AND logic circuit and each OR logic circuit comprising,
a tunnel diode exhibiting high and low voltage operating conditions and having at least one electrode,
input means connected to one electrode of said tunnel diode,
output means connected to said one electrode of said tunnel diode,
bias means connected to said tunnel diode to normally bias said tunnel diode to the low voltage operating condition,
first clock pulse supplying means connected to said one electrode of said tunnel diode to supply periodic signals of sufficient magnitude switch said tunnel diode to the high voltage operating condition in response to predetermined signal levels at said input means,
and second clock pulse supplying means connected to said one electrode of said tunnel diode to supply periodic signals of opposite polarity and at different times relative to the signals supplied by said first clock pulse supplying means with sufficient magnitude for resetting said tunnel diode to said low voltage operating condition.

5. An AND logic circuit comprising, a tunnel diode characterized by a negative resistance characteristic wherein two stable operating states are separated by an unstable operating state and a peak current value between said unstable operating state and one of said stable operating states,
input means directly connected to the anode of said tunnel diode,
output means connected to said tunnel diode anode,
bias means connected to said tunnel diode,
said bias means supplying current having a magnitude near to, but below, the peak current of said tunnel diode such that said tunnel diode operates in one of said stable operating states and provides a first positive potential at the anode thereof,
clock pulse supplying means connected to said tunnel diode to provide current pulses having a magnitude sufficient to drive said tunnel diode past said peak current value in the absence of a predetermined signal condition at said input means such that said tunnel diode operates in the other of said stable operating states and provides a second positive potential at the anode thereof,
and reset means for returning said tunnel diode to the original operating condition.

6. An OR logic circuit comprising, a tunnel diode characterized by a negative resistance characteristic wherein two stable operating states are separated by an unstable operating state and a peak current value between said unstable operating state and one of said stable operating states,
input means directly connected to the cathode of said tunnel diode,
output means connected to said tunnel diode cathode,
bias means connected to said tunnel diode,
said bias means supplying current having a magnitude near to, but below, the peak current of said tunnel diode such that said tunnel diode operates in one of said stable operating states and provides a first negative potential at the cathode thereof,
clock pulse supplying means connected to said tunnel diode to provide current pulses having a magnitude sufficient to drive said tunnel diode past said peak current value in the absence of a predetermined signal condition at said input means such that said tunnel diode operates in the other of said stable operating states and provides a second negative potential at the cathode thereof,
and reset means for returning said tunnel diode to the original operating condition.

7. An inverting logic circuit, said inverting circuit comprising, a tunnel diode characterized by high and low voltage operating conditions, input means connected to said tunnel diode, output means connected to said tunnel diode, bias means connected to said tunnel diode to normally bias said tunnel diode to the low voltage operating condition, said bias means connected to said tunnel diode such that said tunnel diode is effectively floating with respect to ground potential, clock pulse supplying means connected to said tunnel diode to supply periodic signals of sufficient magnitude to switch said tunnel diode to the high voltage operating condition in response to predetermined signal levels at said input means, and reset means for returning said tunnel diode to said low voltage operating condition.

8. The inverting logic circuit of claim 7 wherein said tunnel diode includes an anode and a cathode, and said bias means includes first and second substantially constant current sources of similar magnitude but opposite polarity connected to said anode and said cathode respectively.

9. The logic system of claim 3 including at least one inverting logic circuit, each said inverting logic circuit being coupled between two adjacent logic circuits which perform the same logic function, each said inverting circuit comprising a tunnel diode characterized by high and low voltage operating conditions, input means connected to each said tunnel diode, output means connected to each said tunnel diode, bias means connected to each said tunnel diode to normally bias said tunnel diode to the low voltage operating condition, said bias means connected to each said tunnel diode such that said tunnel diode is effectively floating with respect to ground potential, and clock pulse supplying means connected to each said tunnel diode to supply periodic signals of sufficient magnitude to switch each said tunnel diode to the high voltage operating condition in response to predetermined signal levels at the associated one of said input means.

10. The logic system of claim 9 in which the input means and the output means are connected to different electrodes of the tunnel diode comprising the inverting logic circuit.

11. A logic system comprising; a plurality of AND logic circuits; and a plurality of OR logic circuits; each of said AND logic circuits comprising; a tunnel diode characterized by a negative resistance characteristic wherein two stable operating states are separated by an unstable operating state and a peak current value between said unstable operating state and one of said stable operating states, input means connected to the anode of said tunnel diode, output means connected to the anode of said tunnel diode, bias means connected to said tunnel diode, said bias means supplying current having a magnitude near to, but below, the peak current of said tunnel diode such that said tunnel diode operates in one of said stable operating states and provides a first positive potential at the anode thereof, clock pulse supplying means connected to said tunnel diode to provide current pulses having a magnitude sufficient to drive said tunnel diode past said peak current value in the absence of a predetermined signal condition at said input means such that said tunnel diode operates in the other of said stable operating states and provides a second positive potential at the anode thereof, and reset means for returning said tunnel diode to the original operating condition; each of said OR logic circuits comprising; a tunnel diode characterized by a negative resistance characteristic wherein two stable operating states are separated by an unstable operating state and a peak current value between said unstable operating state and one of said stable operating states, input means connected to the cathode of said tunnel diode, output means connected to the cathode of said tunnel diode, bias means connected to said tunnel diode, said bias means supplying current having a magnitude near to, but below, the peak current of said tunnel diode such that said tunnel diode operates in one of said stable operating states and provides a first negative potential at the cathode thereof, clock pulse supplying means connected to said tunnel diode to provide current pulses having a magnitude sufficient to drive said tunnel diode past said peak current value in the absence of a predetermined signal condition at said input means such that said tunnel diode operates in the other of said stable operating states and provides a second negative potential at the cathode thereof, and reset means for returning said tunnel diode to the original operating condition, said AND logic circuits and said OR logic circuits being connected together in alternating arrangement.

12. The logic system of claim 11 including, at least one inverting logic circuit, each said inverting logic circuit being coupled between two adjacent logic circuits which perform the same logic function, each said inverting circuit comprising a tunnel diode characterized by high and low voltage operating conditions, input means connected to each said tunnel diode, output means connected to each said tunnel diode, bias means connected to each said tunnel diode to normally bias said tunnel diode to the low voltage operating condition, said bias means connected to each said tunnel diode such that said tunnel diode is effectively floating with respect to ground potential, clock pulse supplying means connected to each said tunnel diode to supply periodic signals of sufficient magnitude to switch each said tunnel diode to the high voltage operating condition in response to predetermined signal levels at the associated one of said input means, and reset means for returning said tunnel diode to said low voltage operating condition.

References Cited by the Examiner

UNITED STATES PATENTS

| | | | |
|---|---|---|---|
| 3,054,002 | 9/62 | Tenich | 307—88.5 |
| 3,078,376 | 2/63 | Lewin | 307—88.5 |
| 3,114,846 | 12/63 | Pressman | 307—88.5 |
| 3,115,585 | 12/63 | Feller et al. | 307—88.5 |

OTHER REFERENCES

Chaplin et al., "Wide Tolerance Logic Circuits Using Tunnel Diodes in the Voltage Mode and Rectifier Diode Coupling," International Solid-State Circuits Conference, Feb. 15, 1961, pages 38, 39, FIG. 3.

Electronics, "Tunnel Diode Logic Circuit," by Chow, June 24, 1960, pages 103–107.

Lewin et al., "The Tunnel Diode as a Logic Element," International Solid-State Circuits Conference, Feb. 10, 1960, pages 10 and 11, FIG. 4.

Univ. of Ill., Graduate College Digital Computer Lab. Report, "Applications of Tunnel Diodes in Switching Circuits," by Kunihiro, October 26, 1960, page 6.

Washburn, "An Application of Boolean Alegbra to the Design of Electronic Switching Circuits," AIEE Transactions Communications and Electronics, vol. 72, No. 1, 1953.

Kosonucky, "Nand, Nor Tunnel Diode Logic Network," RCA Technical Notes, September, 1961, RCA TN No. 460.

ARTHUR GAUSS, *Primary Examiner.*

UNITED STATES PATENT OFFICE
CERTIFICATE OF CORRECTION

Patent No. 3,198,959

August 3, 1965

Brian Elliott Sear

It is hereby certified that error appears in the above numbered patent requiring correction and that the said Letters Patent should read as corrected below.

Column 4, line 70, for "352" read -- 354 --; column 10, line 41, for "-500" read -- +500 --.

Signed and sealed this 22nd day of February 1966.

(SEAL)
Attest:

ERNEST W. SWIDER
Attesting Officer

EDWARD J. BRENNER
Commissioner of Patents